US008846267B2

(12) United States Patent
Highgate et al.

(10) Patent No.: US 8,846,267 B2
(45) Date of Patent: Sep. 30, 2014

(54) MEMBRANE ELECTRODE ASSEMBLIES

(75) Inventors: Donald James Highgate, Essex (GB); Jonathan Anthony Lloyd, Sheffield (GB); Simon Bourne, Sheffield (GB); Rachel Louise Smith, Sheffield (GB)

(73) Assignee: ITM Power (Research) Ltd., South Yorkshire (GB)

( * ) Notice: Subject to any disclaimer, the term of this patent is extended or adjusted under 35 U.S.C. 154(b) by 1140 days.

(21) Appl. No.: 11/993,708

(22) PCT Filed: Jun. 27, 2006

(86) PCT No.: PCT/GB2006/002369
§ 371 (c)(1),
(2), (4) Date: Sep. 24, 2009

(87) PCT Pub. No.: WO2007/000593
PCT Pub. Date: Jan. 4, 2007

(65) Prior Publication Data
US 2010/0159349 A1    Jun. 24, 2010

(30) Foreign Application Priority Data

Jun. 27, 2005  (GB) .................................. 0513084.4
Jun. 28, 2005  (GB) .................................. 0513172.7

(51) Int. Cl.
*H01M 8/10*    (2006.01)
*H01M 4/88*    (2006.01)
*C25B 9/10*    (2006.01)
*H01M 8/02*    (2006.01)
*H01M 8/24*    (2006.01)

(52) U.S. Cl.
CPC ............. *C25B 9/10* (2013.01); *H01M 8/0271* (2013.01); *H01M 8/0273* (2013.01); *H01M 8/0276* (2013.01); *H04M 8/028* (2013.01); *H01M 8/0284* (2013.01); *H01M 8/0289* (2013.01); *H01M 8/0286* (2013.01); *H01M 4/8807* (2013.01); *H01M 4/8896* (2013.01); *H01M 8/0234* (2013.01); *H01M 8/1004* (2013.01); *H01M 8/1006* (2013.01); *H01M 8/1027* (2013.01); *H01M 8/103* (2013.01); *H01M 8/1044* (2013.01); *H01M 8/106* (2013.01); *H01M 8/1067* (2013.01); *H01M 8/1072* (2013.01); *H01M 8/241* (2013.01); *H01M 8/2475* (2013.01); *H01M 2250/20* (2013.01); *H01M 2300/0082* (2013.01); *Y02E 60/521* (2013.01); *Y02T 90/32* (2013.01)
USPC ............ 429/509; 429/507; 429/508; 429/510

(58) Field of Classification Search
CPC ............ H01M 8/1004; H01M 8/0247; H01M 8/0258; H01M 8/0271; H01M 8/0273; H01M 8/0276; H01M 8/028; H01M 8/0284; H01M 8/0286; H01M 8/0289; Y02E 60/521
USPC ......... 429/139, 460, 469, 483, 508, 510, 507, 429/509
See application file for complete search history.

(56) References Cited

U.S. PATENT DOCUMENTS

| 4,036,788 | A | 7/1977 | Steckler |
| 4,326,958 | A | 4/1982 | Kawahara et al. |
| 5,597,661 | A | 1/1997 | Takeuchi et al. |
| 5,643,689 | A | 7/1997 | Fleischer et al. |
| 5,643,968 | A | 7/1997 | Andreola et al. |
| 5,814,372 | A | 9/1998 | Moya |
| 6,063,517 | A * | 5/2000 | Montemayor et al. ........ 429/492 |
| 6,149,810 | A | 11/2000 | Gonzalez-Martin et al. |
| 6,203,949 | B1 | 3/2001 | Ehrlich |
| 6,395,325 | B1 | 5/2002 | Hedge et al. |
| 6,506,511 | B1 * | 1/2003 | Lakeman et al. ............. 429/421 |
| 7,318,972 | B2 | 1/2008 | Highgate |
| 2002/0102451 | A1 | 8/2002 | Acker et al. |
| 2003/0148159 | A1 | 8/2003 | Cox et al. |
| 2004/0142227 | A1 | 7/2004 | Sugai et al. |
| 2005/0014056 | A1 | 1/2005 | Zuber et al. |
| 2005/0048346 | A1 | 3/2005 | Fannon et al. |
| 2005/0118477 | A1 | 6/2005 | Kiefer et al. |
| 2005/0196666 | A1 | 9/2005 | Gottesfeld et al. |
| 2006/0002844 | A1 * | 1/2006 | Suenaga et al. ............. 423/447.3 |
| 2006/0127734 | A1 | 6/2006 | McLean et al. |
| 2006/0127738 | A1 * | 6/2006 | Sompalli et al. ............. 429/36 |
| 2008/0095925 | A1 | 4/2008 | Highgate |

FOREIGN PATENT DOCUMENTS

| DE | 10 2005 010 039 | 9/2005 |
| EP | 0 827 228 | 3/1998 |
| EP | 1 001 666 | 5/2000 |
| EP | 1 085 051 | 3/2001 |
| EP | 1 394 879 | 3/2004 |
| GB | 1 463 301 | 2/1977 |
| GB | 2 412 005 | 9/2005 |
| JP | 05-109419 | 4/1993 |
| JP | 09-199144 | 7/1997 |
| JP | 11-302410 | 11/1999 |
| JP | 2000-119420 | 4/2000 |

(Continued)

OTHER PUBLICATIONS

McElroy, J. F. et al., "SPE® Hydrogen/Oxygen Fuel Cells for Rigorous Naval Applications," *Proceedings of the International Power Sources Symposium*, Jun. 25-28, 1990, pp. 403-407.

Buchi et al. "Study of radiation-grafted FEP-g-Polystyrene membranes as polymer electrolytes in fuel cells" *Electrochimica Acta*, 1995, pp. 345-353, No. 3.

Crisp, J.A. et al., "Development of Improved Membranes for Solid Polymer Fuel Cells," *Fifth Grove Fuel Cell Symposium: Fuel Cells—Investing in a Clean Future*, Sep. 22-25, 1997. Poster No. 50, London, UK.

*Primary Examiner* — Ladan Mohaddes
(74) *Attorney, Agent, or Firm* — Saliwanchik, Lloyd & Eisenschenk

(57) ABSTRACT

A flexible MEA comprises an integral assembly of electrode, catalyst and ionomeric membrane material.

13 Claims, 4 Drawing Sheets

(56) References Cited

FOREIGN PATENT DOCUMENTS

| JP | 2000-277131 | 10/2000 |
| JP | 2001-035509 | 2/2001 |
| WO | WO 98/22989 | 5/1998 |
| WO | WO 01/49824 | 3/2001 |
| WO | WO 01/46283 | 6/2001 |
| WO | WO 01/60872 | 8/2001 |
| WO | WO 02/058205 | 7/2002 |
| WO | WO 02/087001 | 10/2002 |
| WO | WO 02/097911 | 12/2002 |
| WO | WO 03/023890 | 3/2003 |
| WO | WO 03/074597 | 9/2003 |
| WO | WO 2004/021486 | 3/2004 |

* cited by examiner

MEMBRANE ELECTRODE ASSEMBLIES

This application is a National Stage Application of International Application Number PCT/GB2006/002369, filed Jun. 27, 2006; which claims priority to Great Britain Application No. 0513084.4, filed Jun. 27, 2005 and Great Britain Application No. 0513172.7, filed Jun. 28, 2005.

FIELD OF THE INVENTION

This invention relates to membrane electrode assemblies.

BACKGROUND OF THE INVENTION

Electrochemical cells, particularly including solid polymer fuel cells and electrolysers, are conventionally constructed of a membrane electrode assembly (MEA) which is contained in rigid manifold structures to deliver the fuel, and rigid metal or graphite bi-polar plates to separate the individual cells in a cell stack.

Moreover, the individual MEAs are normally constructed such that the catalyst is pressed into the surface of a thermoplastic membrane (Nafion being the industry standard material) and the conduction electrodes pressed onto the catalyst coating. The electrode is maintained in contact by pressure applied over the entire area of the MEA by the constraining manifold and/or bi-polar plate structure.

This conventional structure arose historically from the 'filter press' process and is effective; but it is rigid, of poor vibration-resistance, and not well suited to the production of lightweight cells possessing good shock-resistance or mechanical flexibility.

WO03/023890 describes making MEAs and entire cell stacks which are able to deliver electrochemical cells, specifically fuel cells and electrolysers, of low weight and flexible, vibration-resistant construction.

SUMMARY OF THE INVENTION

In accordance with a first aspect of the invention, a flexible MEA comprises an integral assembly of electrode, catalyst and ionomeric membrane material.

According to a second aspect of the invention, a method for producing a flexible MEA comprises adding the ionomer in monomer or pre-polymer form to the catalyst and electrode, and polymerising the monomer or pre-polymer in situ.

DESCRIPTION OF THE DRAWINGS

The present invention will be illustrated with reference to the accompanying drawings.

DESCRIPTION OF PREFERRED EMBODIMENTS

Figure 1:
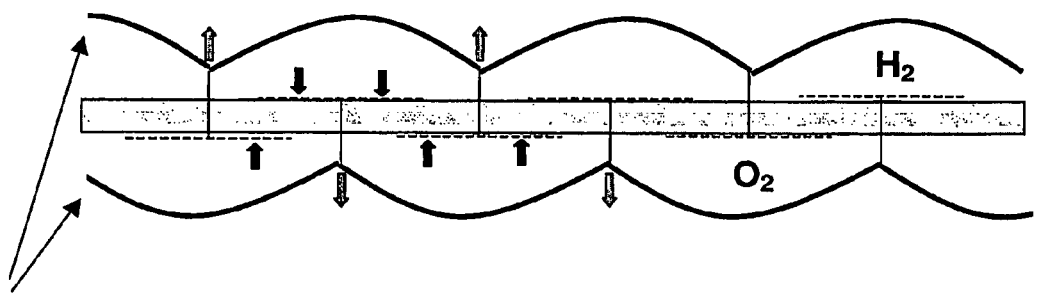
FIG. 1 shows a flexible fuel cell, in which pressure is applied to the catalyst/electrode structure by the internal reactant fluids (gas or liquid).

Embodiments of this invention are:
(A) An intrinsically flexible single cell, which may be elastically or resiliently flexible, without the need to apply or maintain pressure applied by some external structure.
(B) An intrinsically flexible cell stack in which the individual cells are themselves flexible but the design of the stack may modify the degree of flexibility inherent in the individual cells.
(C) A flexible stack composed of a mosaic of individually non-flexible cells, i.e. an articulated stack; all the flexibility is imparted by the design of the stack and the inter-cell connections.
(D) A flexible cell or stack composed of MEAs which do not meet any or all of the criteria required for (A) above: specifically MEAs which are held together and the pressure required to maintain electrical contact applied by an external structure which allows for the imposition of external pressure while retaining flexibility. Such a structure is shown for illustration purposes only in FIG. 1.

In all cases the description 'flexible' may be applied either to a structure which can be deformed and which then remains in the new deformed state until re-shaped, i.e. it needs no external applied force to hold the deformed shape; or to a structure which normally attempts to resume its original shape and needs to be held in the new or deformed condition.

Flexible is taken to mean a cell or cell stack which is inherently flexible, the degree of flexibility being indicated by the ability of the structure (initially flat), to be curved to a given radius and returned to its original flat form without significantly degrading the efficiency of operation. This definition is indicative; it cannot be applied unequivocally to complex multi-cell stack structures for example in the form shown in FIG. 3; this is a preferred 'waffle' shape which, as an example, has different properties in extension (along the folds) or in flexure across the MEAs.

In a preferred embodiment, the MEA can be bent round the surface of a cylinder of 100 cm diameter while maintaining continuous contact with the surface of the cylinder.

In a further preferred embodiment, the MEA is flexible in two dimensions, and can be bent round a sphere of 100 cm diameter while maintaining continuous contact with the surface of the sphere.

In a fuel cell stack, flexibility may apply in one directly only; the device may be relatively stiff in the other direction, for example, it may be a folded, or "concertina", stack design.

Conditions under which flexibility can be achieved include the following:
(i) bonding of the electrode (whether it is metallic, carbon fibre or polymeric) into or onto the ionomer surface; this is readily achieved using the process of WO03/023890, where the electrode is incorporated into the ionomer surface by in-situ polymerization. It may also be achieved by using an ionically active adhesive.
(ii) bonding of the catalyst into or onto the ionomer surface, and possibly also onto the electrode surface.
(iii) attachment of the ionomer to a non-ionic (but possibly hydrophilic and/or possibly pre-stressed in order to match expansion strains) structure to facilitate connection to the manifold or other external structures and electrically isolate one cell from adjacent cells both electronically and ionically. This could be achieved by the use of a suitable adhesive but it is preferred to use interpenetrated network polymer systems (IPN), as disclosed in GB1463301.
(iv) construction of flexible manifolds using the ionomer (as disclosed in WO03/023890) or some other deformable material preformed and joined onto or formed against the rest of the MEA structure.

An important embodiment of this invention, in producing intrinsically flexible cells, relates to creating a graduation of properties within an effectively single mechanical structure such that each can play the part required of it in the electrochemical process but remain a single mechanical structure and exhibit good tolerance to mechanical distortion, vibration or impact.

Certain plastic materials that are non-ionically and non-electronically conductive can be selectively penetrated by suitable monomers to form IPN interfaces. For example, Trogamid CX is almost immune to penetration by vinyl pyrrolidone, whereas Trogamid T is highly penetrated. These penetrations are not usually disturbed by the additional ionic ingredients necessary to form an ionomer. In some cases however, it may be preferred to form a non-ionic interface between the ionic membrane and the polyamide frame, forming a three-stage join (polyamide to non-ionic interface to ionic monomer). Similarly, it has been found that various electrode materials, from metallic mesh to conductive carbon fibres, will bond as a composite with the polymerising ionic monomers.

Selecting a blend of Trogamid CX 80% and Trogamid T 20% gives a polyamide, which, after allowing a suitable time of 30 minutes, the non-ionic monomer systems can have penetrated to a depth of 0.5 mm. Upon polymerisation, this forms an interpenetrated network (IPN) joint. When a hole is cut in the non-ionic monomer and the ionomer mixture is polymerised into it, a further IPN is formed. The resulting component is electronically and ionically isolated on the bulk of the polyamide yet ionically conductive in the bulk of the ionomer membrane. Due to the IPN regions, there is a graduation of properties between the ionomer, non-ionic region and the polyamide. This technique can be used to create either or both boundaries to a membrane or support posts integral to a membrane.

In a preferred embodiment, an electrically insulating edge region or perimeter (frame), which defines the electrical edge of the MEA, also provides a liquid seal and mechanical support and allows individual MEAs to be combined into a stack. The frame must be joined to the ionomer (via the IPN region) and this may present difficulties if the ionomer expands or contracts as a result of hydration or dehydration following polymerisation (during assembly or use). The frame may be pre-stressed (if it is formed from a cross-linked polymer) when it can be activated by hydration (as is well known for hydrophilic materials). Alternatively, it may be extended and re-shaped by heat and pressure if it is a thermoplastic. By either method, it is possible to match the mechanical properties and dimensions of the frame to the hydrated membrane, in order to minimise internal membrane stress during operation as a cell. The frame does not necessarily need to be matched to the dimensions or properties of the ionomer at full hydration.

The second aspect of the invention comprises a method of producing a membrane electrode assembly, characterised in that it is flexible. In a preferred embodiment, the electrode material, e.g. woven metal mesh or carbon fibre mesh, is placed in a mould prior to the introduction of the ionomer in monomer or pre-polymer form. The polymerisation process integrates the mesh into an outer layer of the 'membrane' and removes the need for any externally applied force to maintain electrical contact or mechanical integrity.

The catalyst can be integrated into the membrane surface by a similar process, or it can be applied to the surface of the electrode mesh; either process is effective and avoids the need for externally applied pressure.

The resulting structure consists of a mesh/ionomer/mesh composite and the flexibility of this complex structure will be dependent inter alia upon the elastic properties of the ionomer and the tensile properties of the mesh. In order to maximise flexibility, the ionomer should be as thick as possible (consistent with good ionic properties) and elastic, while the mesh should be formed from elastic fibres or inextensible fibres which may additionally be 'crimped' prior to weaving so that the final mesh is itself extensible as a result of the 'crimping' and weave.

The flexible MEA may be included into a flexible manifold system that may be formed from the same ionomeric materials as the MEA (as disclosed in WO03/023890) or from a material such as low-density polyethylene. This material acts both to contain the fuel and to separate the cell electrically from any adjacent cell in a stack. It stands in lieu of a conventional bi-polar plate when the electrical connections from cell to cell are made via external interconnects (in the same way as connections are made from one lead acid battery cell to the next).

As an alternative to the incorporation of a conductive mesh or fibre into the surface of the MEA to serve as an electrode, it is possible to construct an MEA in which the catalyst is incorporated into the surface of the ionomer by any of the methods referred to herein but the electrode is composed of a electronically conductive polymer which can be applied to the surface of the MEA as a liquid monomer mixture or pre-polymer (e.g. by screen-printing or 'ink-jet' spray techniques) and polymerised to form a solid polymer in situ. The result is an inherently conducting structure, which is also flexible as defined herein.

Figure 3:
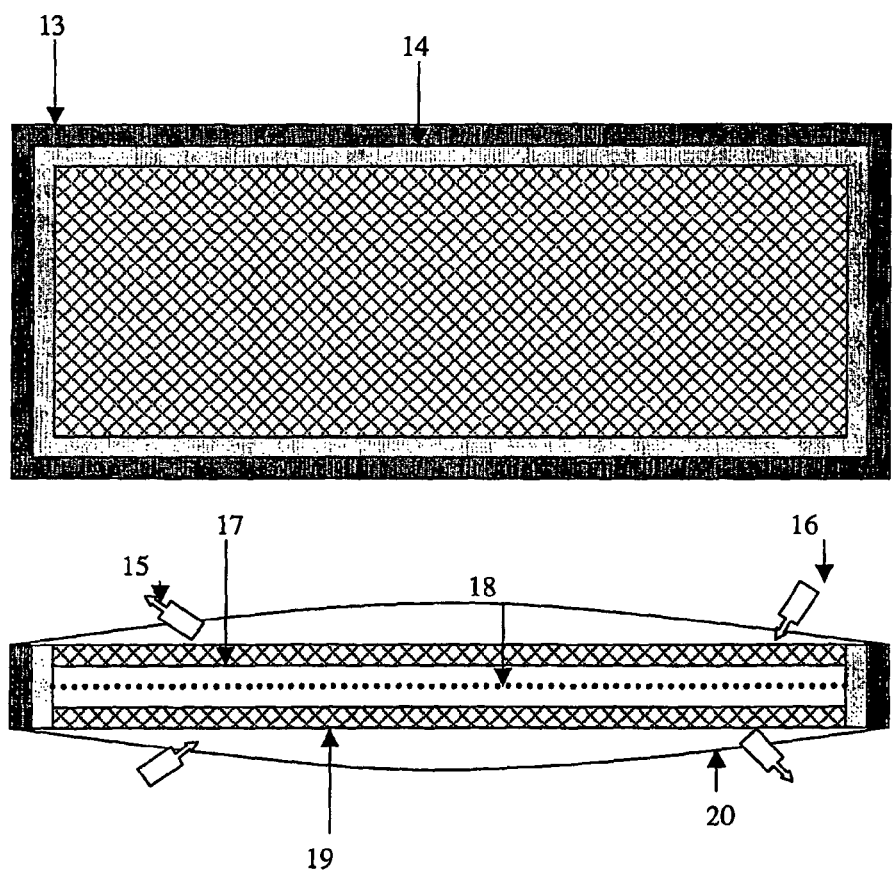
FIG. 3 shows an intrinsically flexible MEA.

An intrinsically flexible single cell (embodiment A) may be useful when a small, fully flexible portable power source is required. For example, it may be sewn into items of clothing such as a T-shirt or shoe and could be used, with a suitable electronic interface, to power personal stereos or mobile phones. This embodiment is illustrated in FIG. 3.

The intrinsically flexible cell (embodiment A) consists of a polyamide (polyamide 6 or Trogamid T) frame 13. It is desirable that the inner edge of the frame be prepared so that the ionomer will bond to the frame and prevent leakage. This is achieved by forming an IPN layer 14 on the inner edge of the frame. FIG. 3 additionally shows weld fuel input 16 and output 15 connectors.

Two sheets of Pt or Pd catalyst-coated Stainless Steel (SS) mesh 19 are pressed onto polythene sheets to prevent 'blinding' by the liquid monomer and thermally welded to the polyamide frame 13. A non-woven separator 18 prevents electrical contact between the SS mesh layers 19 prior to introduction of the ionomer 17. This may be a loose fit in the gap in the centre of the polyamide frame or thermally pressed into the polyamide.

The liquid monomer is introduced into the space within the polyamide frame 13 between the SS mesh 19 and left for a time necessary for the monomer to diffuse into the pre-treated edge of the polyamide frame. The monomer is then polymerised by gamma irradiation or thermal means. This process simultaneously forms the ionomer of the 'membrane' and polymerises the IPN region 14, thus achieving a liquid and gas-proof seal at the junction between the electrically insulating frame and the ionomer. Alternatively, the IPN may be made by heat sealing, between the non-woven separator 18 and the polyamide frame 13.

On completion of the polymerisation process, the polythene films are removed from the outside of the two SS mesh sheets and the MEA introduced into a polyamide sleeve 20, which serves as the manifold for delivery of the fuel and oxidant and completes the electrical isolation of the MEA. The manifold sleeve is sealed to at least the 'long' edges (AA') of the frame by a welding process.

The production of a stack of intrinsically flexible cells (embodiment B) may be achieved by the repeated application of such processes or by the integral production of a structure in which the individual 'frames' are sealed by use of a final injection moulding stage. Many different architectures are possible using the process described above.

An intrinsically flexible cell stack may be useful as a backpack for military missions where portable power is a necessity. The cells are vibration and shock resistant, and may be used when parachuting onto a battlefield. These flexible cells may either hold their shape when deformed (without external force) or return to their original shape after deforming. If external force is necessary to hold the deformed shape the cell could be packaged in a material which is capable of holding its shape when deformed. The cells may also be incorporated into an item of clothing. If the clothing is worn on the back, it would aid comfort and allow the expansion of the chest during breathing to drive the circulation of fuel in the cell.

Figure 4:
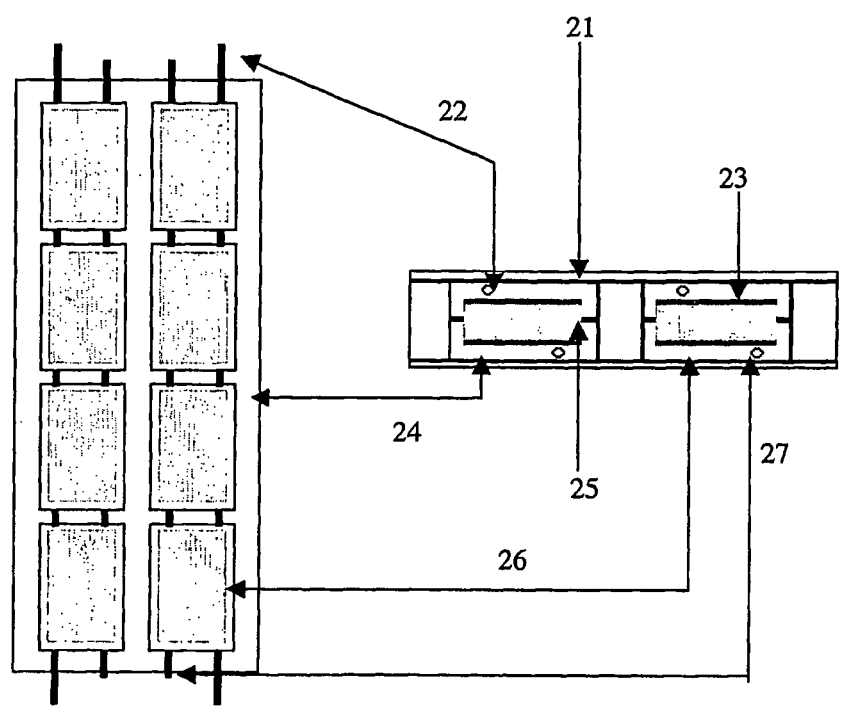
FIG. 4 is an example of an articulated stack of rigid cells.

A further embodiment (C) is illustrated in FIG. 4, and comprises cells in a rigid perspex cell housing 26, which are then articulated in a flexible foam stack 24 with a flexible polythene top and bottom 21. The stack includes a fuel inlet 22 and an oxidant outlet 27 each cell has a membrane 25 and platinum coated stainless steel mesh electrode 23.

The support material in the stack may also be constructed from a silicone elastomer. The support material is used to modify the mechanical properties of the stack. The resulting structure can be flexed while in operation but the cells themselves are not flexible as defined herein.

A flexible stack of rigid cells may be useful in underwater devices, where external pressure may affect performance.

Embodiment (D), a flexible cell or stack comprising MEAs, which require pressure to maintain electrical contact, may be useful where the individual components of the MEA cannot be bonded together. An example of an MEA requiring external pressure is shown in FIG. 1.

Figure 2:
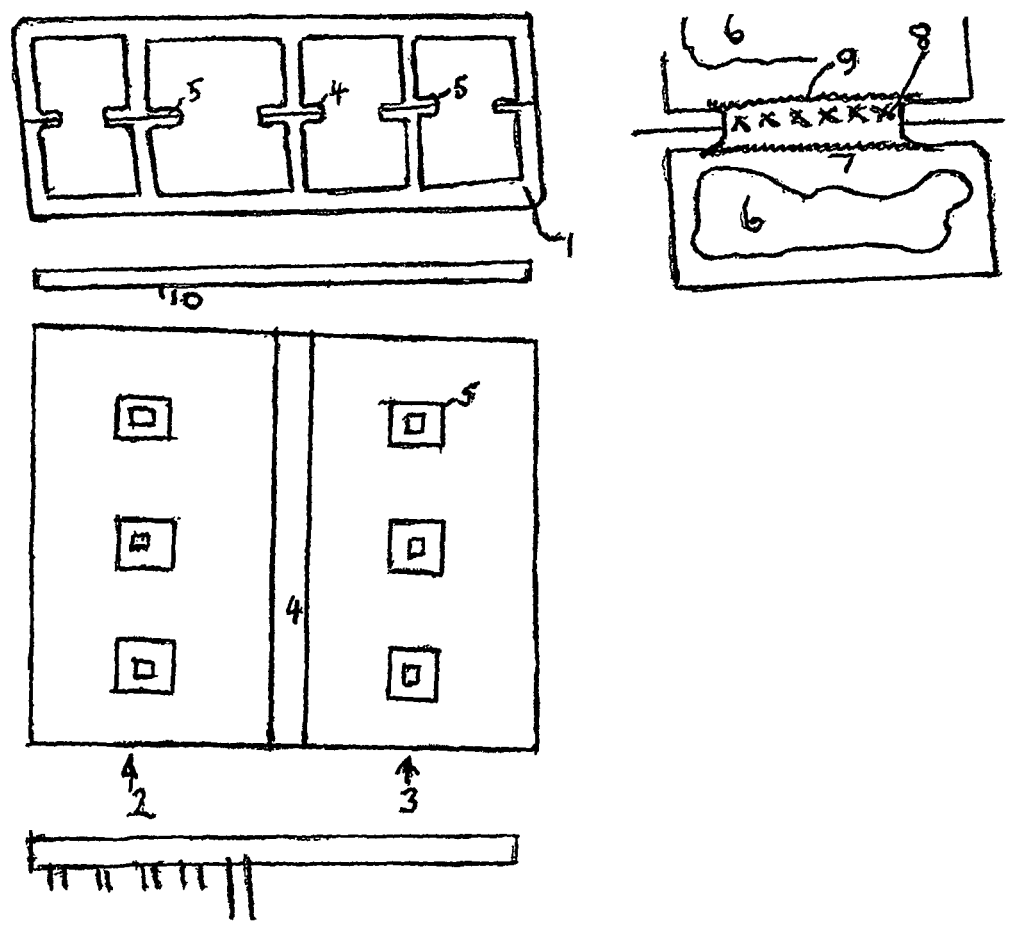
FIG. 2 is a multi-chamber injection moulded and welded construction fuel cell.

FIG. 2 also shows an MEA requiring external pressure. The MEA may be made using the method disclosed in WO03/023890. A multi-chamber injection moulded and welded construction fuel cell casing 1 is made from a polyamide blend of Trogamids CX 80%, T 20%. Prior to welding the two moulded halves together a suitable membrane separator 8 (nonwoven polyester by 100 micron) is placed between the external cases, parts of which will become welded to the case. The casing is divided by an internal wall 4. It is thus comprised of two internal compartments 2 and 3 and will thus become a two-cell stack.

Each of the compartments has internal support posts 5 (three in each) which function to make the casing 1 resistant to internal pressure from fuels, and will eventually support the membrane and electrodes in place whilst retaining ionic isolation.

For the final production stage each fuel void has a sacrificial polythene bag 6 placed in it. A suitably catalysed electrode is placed up against the separator mesh (catalyst coating away from the separator) on both sides of it. A closure plate 10 is welded to be casing end and the sacrificial bag is fully inflated. The ionic monomer mixture is then introduced to the remaining cavity partially occupied by the separator mesh and allowed to soak into the exposed surfaces of electrodes 7 and 9, and to interpenetrate the casing flange, for 30 minutes.

The mixture is then polymerised by thermal means or gamma radiation.

The resulting component then has a closure plate welded onto the remaining open end, which allows for fuel introduction and removal and electrical connection.

The following Examples illustrate the invention.

Example 1

An MEA is constructed as shown in FIG. 3. An IPN layer is formed on the inner edge of a polyamide or Trogamid T frame and two sheets of Pt or Pd catalyst-coated stainless steel mesh are thermally welded to the frame. The liquid ionomer is introduced in monomer form and polymerised in situ. A liquid oxidant of 40 g 5 M sulphuric acid, 40 g 35% wt hydrogen peroxide and 9 g water and a liquid fuel of 2.8 g potassium hydroxide, 2 g sodium borohydride and 95 g water were used. The open circuit voltage was 1.4 V, the power density was 19.1 mW/cm$^2$. The cell was flexed during use without detriment to cell performance.

Another MEA was produced by a similar process but without an IPN frame. This was put into a flexible manifold made from silicone, which was bolted round the edge of the cell, and silicone sealant was used to seal any leaks. When the same fuel and oxidant were used, the open circuit voltage was 1.3 V and the power density was 43 mW/cm$^2$. The cell was flexed during use without detriment to cell performance.

Example 2

An MEA is constructed as shown in FIG. 4.

Eight identical cells were made each using 8 cm×4 cm acid polymer membranes. Platinum catalyst-coated stainless steel mesh was used as the catalyst and electrode pressed against the membrane. Each single cell was fitted into rigid Perspex manifolding, and the eight rigid cells were then fitted into a flexible foam frame, with cell sized holes cut out. Fuel and oxidant was fed in two channels, each line going through four cells.

The liquid oxidant used was 40 g 5 M sulphuric acid, 40 g of 35% wt hydrogen peroxide and 9 g water.

The liquid fuel used was 2.8 g potassium hydroxide, 2 g sodium borohydride and 95 g water.

This resulted in an open circuit voltage of 10.6 V (all cells over 1.3 V). The stack was run at 7 W at 7 V. The cell was flexed during use without detriment to cell performance.

The invention claimed is:

1. A membrane electrode assembly comprising an integral assembly of electrode, catalyst and ionomeric membrane, characterised in that the assembly is flexible when in use,
   wherein the assembly further comprises, around a perimeter thereof, an electrically insulating portion, and
   wherein the assembly further comprises a polymeric interpenetrated network joint connecting the electrically insulating portion and the ionomeric membrane.

2. The assembly according to claim 1, which can be bent around the surface of a cylinder of 100 cm diameter.

3. The assembly according to claim 1, wherein the ionomer and the insulating portion can absorb water and expand, and wherein the insulating portion is pre-stressed such that it expands to the same degree as the ionomer.

4. The assembly according to claim 1, wherein the electrode and/or the catalyst are bonded to the ionomeric membrane.

5. The assembly according to claim 1, wherein the electrode comprises crimped, non-extendable fibres.

6. The assembly according to claim 1, wherein the catalyst is on or within the electrode.

7. A flexible stack of membrane electrode assemblies, wherein the flexible stack comprises flexible assemblies that comprise an integral assembly of electrode, catalyst and ionomeric membrane, wherein the flexible stack is flexible when in use, wherein each assembly further comprises, around a perimeter thereof, an electrically insulating portion, and wherein each assembly further comprises a polymeric interpenetrated network joint connecting the electrically insulating portion and the ionomeric membrane.

8. A fuel cell comprising an assembly according to claim 1, wherein the fuel cell is flexible when in use.

9. An electrolyser comprising an assembly according to claim 1.

10. The assembly according to claim 1, wherein the electrode is a conductive mesh or fiber.

11. A fuel cell comprising a flexible stack according to claim 7, wherein the fuel cell is flexible when in use.

12. The assembly according to claim 1, wherein the electrically insulating portion is a polyamide frame.

13. The stack of membrane electrode assemblies according to claim 7, wherein the electrically insulating portion in each assembly is a polyamide frame.

* * * * *